(12) United States Patent  (10) Patent No.: US 8,725,446 B2
Wegmann  (45) Date of Patent: May 13, 2014

(54) METHOD FOR DETERMINING THE SHAPE OF A WORKPIECE

(75) Inventor: Heinz Wegmann, Mettmenstetten (CH)

(73) Assignee: HOMMEL-ETAMIC GmbH, Villingen-Schwenningen (DE)

( * ) Notice: Subject to any disclaimer, the term of this patent is extended or adjusted under 35 U.S.C. 154(b) by 241 days.

(21) Appl. No.: 12/805,053

(22) Filed: Jul. 8, 2010

(65) Prior Publication Data

US 2011/0010124 A1 Jan. 13, 2011

(30) Foreign Application Priority Data

Jul. 8, 2009 (DE) .......................... 10 2009 032 353

(51) Int. Cl.
*G01L 25/00* (2006.01)
(52) U.S. Cl.
USPC ............... 702/105; 702/81; 702/84; 702/127; 702/155; 33/555.1
(58) Field of Classification Search
USPC ............. 702/105, 155, 167, 84, 81, 113, 127; 33/550–555, 555.1
See application file for complete search history.

(56) References Cited

U.S. PATENT DOCUMENTS

| | | |
|---|---|---|
| 1,425,283 A | 8/1922 | Pratt |
| 1,557,903 A | 10/1925 | Tomberg |
| 1,815,049 A | 7/1931 | Cole |
| 1,892,005 A | 12/1932 | Richmond |
| 1,941,458 A | 1/1934 | Arnold et al. |
| 2,408,672 A | 10/1946 | Mennesson |
| 2,603,043 A | 7/1952 | Bontamps |
| 2,789,354 A | 4/1957 | Polldor et al. |
| 2,909,873 A | 4/1957 | Fisk |
| 2,949,708 A | 8/1960 | Butterworth et al. |
| 3,157,971 A | 11/1964 | Snyder |
| 3,274,683 A | 9/1966 | Witzke |
| 3,321,889 A | 5/1967 | Parrella et al. |
| 3,352,022 A | 11/1967 | Fisk |
| 3,352,065 A | 11/1967 | Enkelmann |
| 3,386,178 A | 6/1968 | Arnold et al. |
| 3,388,178 A | 6/1968 | Arnold et al. |

(Continued)

FOREIGN PATENT DOCUMENTS

| | | |
|---|---|---|
| DE | 2 146 360 | 3/1972 |
| DE | 88446 | 3/1972 |

(Continued)

OTHER PUBLICATIONS

Zvi Drezner, On the circle closest to a set of points, 2002, Computers & Operations Research, 29, 637-650.*

(Continued)

*Primary Examiner* — Sujoy Kundu
*Assistant Examiner* — Harun Chowdhury
(74) *Attorney, Agent, or Firm* — Shlesinger, Arkwright & Garvey LLP

(57) ABSTRACT

Method for measuring the shape of a workpiece includes a measuring sensor used to find measured values that represent the shape of a workpiece. The shape of the workpiece is determined by an iterative method using the measured values. The shape of the workpiece is determined during machining. The determining of the shape during machining is particularly suited for determining the shape during grinding. The shape determined may be the shape of a pin, especially a crankpin for a crankshaft.

7 Claims, 3 Drawing Sheets

(56) References Cited

U.S. PATENT DOCUMENTS

| | | |
|---|---|---|
| 3,603,044 A | 9/1971 | Price |
| 3,648,377 A | 3/1972 | Witzke |
| 3,663,190 A | 5/1972 | Fisk |
| 3,688,411 A | 9/1972 | Asano et al. |
| 3,694,970 A | 10/1972 | Schoonover et al. |
| 3,777,441 A | 12/1973 | Kurimoto et al. |
| 3,793,775 A | 2/1974 | Ishikawa et al. |
| 3,802,087 A | 4/1974 | Raiteri |
| 3,863,352 A | 2/1975 | Peonski |
| 3,987,552 A | 10/1976 | Raiteri |
| 4,106,241 A | 8/1978 | Fisk |
| 4,141,149 A | 2/1979 | George et al. |
| 4,175,462 A | 11/1979 | Simon |
| 4,351,115 A | 9/1982 | Possati |
| 4,414,748 A | 11/1983 | Gauler et al. |
| 4,429,464 A | 2/1984 | Burrus |
| 4,437,239 A | 3/1984 | Possati |
| 4,480,412 A | 11/1984 | Shank et al. |
| 4,485,593 A | 12/1984 | Munzing et al. |
| 4,524,546 A | 6/1985 | Hoover et al. |
| 4,596,076 A | 6/1986 | Sigg |
| 4,606,130 A | 8/1986 | Vetter |
| 4,625,413 A | 12/1986 | Possati et al. |
| 4,637,144 A | 1/1987 | Schemel |
| 4,651,438 A | 3/1987 | Hutter et al. |
| 4,679,331 A | 7/1987 | Koontz |
| 4,807,400 A | 2/1989 | Corallo et al. |
| 4,819,195 A | 4/1989 | Bell et al. |
| 4,903,413 A | 2/1990 | Bellwood |
| 4,958,442 A | 9/1990 | Eckhardt |
| 4,986,004 A | 1/1991 | Hartmann et al. |
| 5,021,650 A | 6/1991 | Rieder et al. |
| 5,054,205 A | 10/1991 | Danielli |
| 5,058,325 A | 10/1991 | Pineau |
| 5,077,908 A | 1/1992 | Moore |
| 5,086,569 A | 2/1992 | Possati et al. |
| 5,088,207 A | 2/1992 | Betsill et al. |
| 5,095,634 A | 3/1992 | Overlach et al. |
| 5,097,602 A | 3/1992 | Cross et al. |
| 5,099,585 A | 3/1992 | Liskow |
| 5,123,173 A | 6/1992 | Possati |
| 5,136,527 A | 8/1992 | Koretz |
| 5,150,545 A | 9/1992 | Esteve |
| 5,337,485 A | 8/1994 | Chien |
| 5,419,056 A | 5/1995 | Breitenstein |
| 5,479,096 A | 12/1995 | Szczyrbak et al. |
| 5,542,188 A | 8/1996 | Ertl et al. |
| 5,551,814 A | 9/1996 | Hazama |
| 5,551,906 A | 9/1996 | Helgren |
| 5,758,431 A | 6/1998 | Golinelli |
| 5,761,821 A | 6/1998 | Laycock |
| 5,771,599 A | 6/1998 | Uchimura et al. |
| 5,902,925 A | 5/1999 | Crispie et al. |
| 5,914,593 A | 6/1999 | Arms et al. |
| 5,919,081 A | 7/1999 | Hykes et al. |
| 5,956,659 A | 9/1999 | Spies et al. |
| 5,982,501 A | 11/1999 | Benz et al. |
| 6,029,363 A | 2/2000 | Masreliez et al. |
| 6,062,948 A | 5/2000 | Schiff et al. |
| 6,067,721 A | 5/2000 | Dall'Aglio et al. |
| 6,088,924 A | 7/2000 | Esteve |
| 6,116,269 A | 9/2000 | Maxson |
| 6,159,074 A | 12/2000 | Kube et al. |
| 6,167,634 B1 | 1/2001 | Pahk et al. |
| 6,256,898 B1 | 7/2001 | Trionfetti |
| 6,266,570 B1 | 7/2001 | Hocherl et al. |
| 6,298,571 B1 | 10/2001 | Dall'Aglio et al. |
| 6,304,827 B1 | 10/2001 | Blixhavn et al. |
| 6,321,171 B1 | 11/2001 | Baker |
| 6,327,788 B1 * | 12/2001 | Seddon et al. ............... 33/551 |
| 6,415,200 B1 | 7/2002 | Kato et al. |
| 6,430,832 B1 | 8/2002 | Dall'Aglio et al. |
| 6,487,787 B1 | 12/2002 | Nahum et al. |
| 6,487,896 B1 | 12/2002 | Dall'Aglio |
| 6,490,912 B1 | 12/2002 | Volk |
| 6,511,364 B2 | 1/2003 | Ido et al. |
| 6,560,890 B1 | 5/2003 | Madge et al. |
| 6,568,096 B1 * | 5/2003 | Svitkin et al. ............... 33/550 |
| 6,643,943 B2 | 11/2003 | Dall'Aglio et al. |
| 6,645,047 B1 | 11/2003 | Liskow |
| 6,711,829 B2 | 3/2004 | Sano et al. |
| 6,848,190 B2 | 2/2005 | Dall'Aglio et al. |
| 6,931,749 B2 | 8/2005 | Dall'Aglio |
| 6,952,884 B2 | 10/2005 | Danielli |
| 6,955,583 B2 | 10/2005 | Dall'Aglio |
| 7,020,974 B2 | 4/2006 | Danielli et al. |
| 7,024,785 B2 | 4/2006 | Dall'Aglio et al. |
| 7,047,658 B2 * | 5/2006 | Danielli et al. ............... 33/555.1 |
| 7,607,239 B2 | 10/2009 | Dall'Aglio et al. |
| 7,665,222 B2 | 2/2010 | Dall'Aglio |
| 7,690,127 B2 | 4/2010 | Dall'Aglio et al. |
| 7,954,253 B2 | 6/2011 | Dall'Aglio et al. |
| 8,286,361 B2 | 10/2012 | Dall'Aglio et al. |
| 2002/0020075 A1 | 2/2002 | Dall'Aglio et al. |
| 2002/0066179 A1 | 6/2002 | Hall et al. |
| 2002/0155790 A1 | 10/2002 | Ido et al. |
| 2002/0166252 A1 | 11/2002 | Dall'Aglio et al. |
| 2003/0009895 A1 | 1/2003 | Dall'Aglio |
| 2003/0056386 A1 | 3/2003 | Danielli et al. |
| 2004/0045181 A1 | 3/2004 | Dall'Aglio et al. |
| 2004/0055172 A1 | 3/2004 | Danielli |
| 2004/0137824 A1 | 7/2004 | Dall'Aglio |
| 2005/0178018 A1 | 8/2005 | Dall'Aglio et al. |
| 2005/0217130 A1 | 10/2005 | Danielli et al. |
| 2007/0039196 A1 | 2/2007 | Dall'Aglio et al. |
| 2008/0155848 A1 | 7/2008 | Dall'Aglio et al. |
| 2009/0113736 A1 | 5/2009 | Dall'Aglio et al. |
| 2010/0000109 A1 | 1/2010 | Dall'Aglio et al. |
| 2011/0001984 A1 | 1/2011 | Keller et al. |
| 2011/0010124 A1 | 1/2011 | Wegmann |
| 2011/0119943 A1 | 5/2011 | Arnold |
| 2011/0232117 A1 | 9/2011 | Arnold |
| 2011/0283784 A1 | 11/2011 | Seewig |
| 2012/0043961 A1 | 2/2012 | Volk |
| 2012/0224180 A1 | 9/2012 | Keller et al. |

FOREIGN PATENT DOCUMENTS

| | | |
|---|---|---|
| DE | 4412882 | 10/1996 |
| DE | 4419656 | 1/1998 |
| DE | 297 22 951 U1 | 4/1998 |
| DE | 69619857 T2 | 11/2002 |
| DE | 698 09 667 T2 | 4/2003 |
| DE | 600 15 654 T2 | 8/2005 |
| DE | 10 2008 016 228 A1 | 10/2009 |
| EP | 0 068 082 A2 | 1/1983 |
| EP | 0105627 | 4/1984 |
| EP | 0 322 120 A2 | 6/1989 |
| EP | 0 382 336 A2 | 8/1990 |
| EP | 0 489 439 A1 | 2/1992 |
| EP | 0 480 222 A2 | 4/1992 |
| EP | 0 810 067 A1 | 12/1997 |
| EP | 0 859 689 A1 | 8/1998 |
| EP | 0 859 689 B1 | 8/1998 |
| EP | 0859689 A | 8/1998 |
| EP | 0 878 704 A1 | 11/1998 |
| EP | 0 903 199 A2 | 3/1999 |
| EP | 1 063 052 B1 | 12/2000 |
| EP | 1 083 052 A2 | 12/2000 |
| EP | 1 118 833 | 7/2001 |
| EP | WO 0 866 945 B1 | 3/2002 |
| EP | 1 263 547 B1 | 12/2002 |
| EP | 1 370 391 | 11/2003 |
| EP | 1 370 391 B1 | 12/2003 |
| EP | 1370391 A | 12/2003 |
| EP | 1 263 547 B1 | 12/2007 |
| FR | 758177 | 9/1933 |
| GB | 405 817 | 2/1934 |
| GB | 1381276 | 7/1974 |
| GB | 1362996 | 8/1974 |
| GB | 2086778 A | 5/1982 |
| GB | 2 161 101 A | 1/1986 |
| GB | 2 197 477 A | 5/1988 |
| GB | 2 300 582 A | 11/1996 |

(56) References Cited

FOREIGN PATENT DOCUMENTS

| | | |
|---|---|---|
| JP | 53-4285 A | 1/1978 |
| JP | 53-4286 A | 1/1978 |
| JP | 55-6825 | 12/1979 |
| JP | 55120976 | 9/1980 |
| JP | 55-156801 | 12/1980 |
| JP | 59-93844 U | 6/1984 |
| JP | 59125001 | 7/1984 |
| JP | 59-93844 U | 8/1984 |
| JP | 3-68553 A | 3/1991 |
| JP | 3-86889 A | 3/1991 |
| JP | 10-118974 A | 5/1998 |
| JP | 11-513317 A | 11/1999 |
| WO | WO 83/04302 | 12/1983 |
| WO | WO 90/00248 | 1/1990 |
| WO | WO 92/14120 | 8/1992 |
| WO | WO 94/17361 | 8/1994 |
| WO | WO 97/12724 | 4/1997 |
| WO | WO 97/13814 | 4/1997 |
| WO | WO-A-9712724 | 4/1997 |
| WO | WO 97/40434 | 10/1997 |
| WO | WO 99/47884 | 9/1999 |
| WO | WO 02/070195 | 9/2002 |
| WO | WO 02/090047 A1 | 11/2002 |
| WO | 2004/023256 A2 | 3/2004 |

OTHER PUBLICATIONS

Curve fitting best practice, Part 3: Fitting data, 2008, IDBS Enabling Science.*
Martin Marinov, Optimization methods for scattered data approximation with subdivision surfaces, Elsevier Science, Jul. 19, 2005.*
Michael L. Johnson, Parameter Estimation by Least-Squares Methods, 1992, Academic Press Inc.*
U.S. Appl. No. 12/588,504, filed Oct. 2009, Keller.
U.S. Appl. No. 12/662,813, filed May 2010, Keller.
"Automatisierte Dreipunktmessung zur Rundheitsbestimmung an Kolbenbolzen", "Automated Three-Point Measurement for Determining Roundness on Piston Pins", Studienarbeit Jörg Seewig, Universität Hannover, Fachbereich Elektrotechnik, Dec. 1992.
U.S. Appl. No. 12/923,412, filed Sep. 2010, Arnold.
Portion of Marpess Catalogue (circa 1970).
Leaflet—Fenar Marposse (1991).
"Crankshaft Gauging Machines," Hommelwerke (1985).
PCT Intl. Search Report for App. No. PCT/EP00/128078 (mailed Feb. 28, 2003).
PCT Intl. Search Report for App. No. PCT/EP01/00596 (mailed Aug. 16, 2001).
PCT Intl. Search Report for App. No. PCT/EP02/02022 (mailed Jul. 9, 2002).
PCT Intl. Search Report for App. No. PCT/EP02/04394 (mailed Sep. 27, 2002).
PCT Intl. Search Report for App. No. PCT/EP03/05740 (mailed Oct. 30, 2003.
PTO Communication Mailed Jan. 23, 2008 in Response to Suggestion of Interference Filed Feb. 28, 2008, 10 pages.
EP0859689 A1 English language Abstract (1 pg.).
German Patent and Trademark Office (EPMA) Office Action in counterpart German priority application No. 10 2009 042, filed Sep. 22, 2009, dated Apr. 7, 2010 (3 pgs.).
Office Action in counterpart European patent application No. EP 10 00 9546 from European Patent Office (EPO), dated Nov. 2010 (4 pgs.).
Office Action dated Jan. 28, 2011 in German Application No. 10 2010 035 147.4, filed Aug. 23, 2010 (3 pgs.).
European Search Report in EP 11001656, dated Jun. 9, 2011 (3 pgs.).
German Search Report in DE 10 2010 013 069, dated Sep. 23, 2010 (3 pgs.).
Office Action in German priority application No. DE 10 2009 032 353.8, filed Jul. 9, 2010, Office Action dated Nov. 14, 2012 (5 pgs.) and machine translation (5 pgs.) (10 pgs. total).

* cited by examiner

METHOD FOR DETERMINING THE SHAPE OF A WORKPIECE

CROSS-REFERENCE TO RELATED APPLICATIONS

This application claims the priority of German application no. 10 2009 032 353.8, filed Jul. 8, 2009, and which is incorporated herein by reference.

FIELD OF THE INVENTION

The invention relates to a method for determining the shape of a workpiece. More particularly, the invention relates to an iterative method of determining the shape of a workpiece.

BACKGROUND OF THE INVENTION

Especially when machining crankpins for crankshafts on a grinding machine, during the machining process it is necessary to measure continuously whether a desired dimension has been attained and thus the machining process can be terminated or whether the machining process should be continued until the desired dimension has been attained. During in-process measuring, a measuring prism is used, for instance, the legs or edges of which are held in contact with the crankpin to be measured using a suitable mechanism. Using a measuring sensor that is arranged linearly movable on the measuring prism, measurement values are recorded that represent the shape of the crankpin. In the known method, the measurement values are recorded while the crankpin is rotating orbitally about a rotational axis that is parallel to the pin axis and the rotational axis of a grinding wheel being used. Because of the orbital rotation of the crankpin, during which rotation the measuring prism and measuring sensor are held in contact with the crankpin, the measuring prism and thus the measuring sensor rotate relative to the crankpin. If a certain number of measured values are recorded during one complete 360° rotation by the crankpin, these measured values are not allocated to equidistant points along the circumference of the crankpin due to the relative movement between the crankpin and the measuring sensor.

To prevent this from distorting the shape of the workpiece determined using the measured values it is necessary to take into account in the evaluation the relative rotation of the measuring sensor relative to the crankpin.

From EP 1 263 547 B1 a method is known for determining the shape of a workpiece in which measured values representing the shape of the workpiece are recorded and stored in the aforesaid manner by means of a measuring sensor, the workpiece in the method described in EP 1 263 547 B1 being a crankpin for a crankshaft. In the known method, the relative rotation between the measuring sensor and the crankpin is determined, and the measured values recorded by means of the measuring sensor are pre-processed for compensating the relative rotation. From EP 1 263 547 B1, and also from U.S. Pat. No. 5,077,908, EP 0 068 082 A2, and the publication, "Automated Three-Point Measurement for Determining Roundness on Piston Pins", a research paper by Jörg Seewig, University of Hannover, Electrical Engineering Department, December 1992, it is known to subject the pre-processed measured values to a Fourier analysis (harmonic analysis) in order to calculate the shape of the workpiece from the measured values that were found by means of the measuring arrangement, which comprises the measuring prism and the measuring sensor.

OBJECTS AND SUMMARY OF THE INVENTION

An object of the invention is to provide a method for determining the shape of a workpiece as an alternative to the aforesaid method.

This object is achieved using the invention set forth below.

The inventive method for determining the shape of a workpiece includes steps by which:

a) measured values representing the shape of the workpiece are determined and stored by use of a measuring sensor;
b) approximate values representing the shape of the workpiece are determined;
c) modeled measured values are calculated using the approximate values;
d) the measured values found by use of the measuring sensor are compared to the modeled measured values and difference values are calculated;
e) new approximate values are calculated from the difference values for an optimized approximation to the shape of the workpiece;
f) steps c) through e) are iterated until a termination condition is met; and
g) the approximate values in effect when the terminating condition is met are stored as the shape of the workpiece.

With respect to determining the shape of a pin, especially a crankpin for a crankshaft, by means of a measuring arrangement that comprises a measuring prism and a measuring sensor, the invention departs from the thought of determining the shape of the workpiece from the measured values using a Fourier analysis (harmonic analysis). Instead, the thought underlying the invention is to determine the shape of the workpiece from the measured values using an iterative method.

According to invention, determining the shape of a workpiece will also be understood as determining deviations in shapes. Thus with respect to a crankpin for a crankshaft the method according to the invention can be used for instance for measuring or determining a deviation from roundness in the crankpin and/or its diameter, respectively.

If for example the shape of a crankpin for a crankshaft is to be determined during a grinding procedure by means of the method according to the invention, that is, in an in-process measurement, first the measured values representing the shape workpiece are determined by means of a measuring sensor as a function of the angular position of the crankpin.

At least one measuring sensor is used for this according to the invention. However, according to the invention it is also possible to use more than one measuring sensor.

Then the approximate values representing the shape of the workpiece are established in an iterative method according to the invention. Then measured values modeled on them are calculated from the approximate values, taking into account the geometry of the measuring arrangement, especially the measuring prism and its angular position. The measured values found by means of the measuring sensor are then compared to the modeled measured values and difference values are calculated. Then new approximate values are calculated from the difference values for the optimized approximation.

The steps described in the foregoing are repeated until a terminating condition is met. For example and in particular the terminating condition can be a pre-specified maximum difference between especially the standard deviation of the difference values and a limiting value.

In the method according to the invention the approximate values in effect when the terminating condition is met are then stored as the shape of the workpiece, and are preferably stored in polar coordinates for a crankpin with an ideally circular cross-section.

The inventive method thus enables iterative determination of the shape of the workpiece using measured values found by means of a measuring sensor, neither pre-processing of the measured values for correcting a relative rotation between the measuring sensor and the workpiece nor a Fourier analysis being necessary.

One special advantage of the method according to the invention is comprised in that it can be performed very quickly and the shape of the workpiece can be determined with great accuracy and reproducibility. The accuracy can be selected as a function of the application with a corresponding selection of the terminating condition within additional limits.

Fundamentally the method according to the invention for measuring the shape of workpieces may be used outside of a machining process. However, the method according to the invention is particularly well suited for in-process measuring. To this end, one advantageous further embodiment of the invention provides that the shape of the workpiece is determined during a machining process, especially a grinding process.

Fundamentally the method according to the invention is suitable for determining the shape or deviations in the shape of any workpieces. One particularly advantageous further embodiment of the invention provides that the shape of a pin is determined, especially a crankpin for a crankshaft, wherein during the measuring process the pin can perform an orbital rotation about a rotational axis that is parallel to the pin axis, as is provided in another further embodiment.

Especially when the shape of a pin is to be determined, especially the shape of a crankpin, it is advantageous that a measuring prism is used, on which measuring prism the measuring sensor is arranged. According to the invention a measuring prism shall be understood to be an apparatus that is positioned against two locations along the circumference of a pin, the measuring sensor contacting the pin at a distance from the locations at which the measuring prism is positioned against the pin. The measuring prism may in particular be embodied with a V-shaped cross-section or may at least be V-shaped in part.

When using a measuring prism, a linearly movable measuring sensor is advantageously used as is provided by another further embodiment of the invention. The use of a single measuring sensor is sufficient according to the invention. However, two or measuring sensors may also be used according to the invention.

When determining the shape of a pin it is useful that in step a) of the method according to the invention the measured values are determined as a function of the angular position of the pin, as is provided in another advantageous further embodiment of the invention.

In order to ensure that the method according to the invention is especially simple to perform and is simultaneously configured particularly precisely, another advantageous further embodiment provides that step d) includes the following substeps:

d1) calculating correction values from the difference values d2) correcting the approximate values using the correction values.

In the aforesaid embodiment the correction of the approximate values may be performed using the correction values in a desired, suitable manner. In order to configure the calculations to be performed particularly simply and rapidly, one advantageous further embodiment provides that the correction values are added to the approximation values in step d2).

In order to improve or to assure the convergence of the method according to the invention, another further embodiment of the invention provides that a damping factor is taken into account when the correction values are added to the approximate values.

According to the invention the termination condition may be selected as a function of the application and especially as a function of the desired accuracy within other limits. One advantageous further embodiment of the invention provides that in step f) a limiting value for at least one difference value is used for the termination condition. In order to prevent the method according to the invention from being terminated given an unfavorable combination of measured values before a desired accuracy is attained, one advantageous further embodiment of the aforesaid embodiment provides that the standard deviation for the difference values is compared to a limiting value.

The invention shall be explained in greater detail in the following using the attached drawings of an embodiment. All of the features described, depicted in the drawings, and claimed in the patent claims, singly and in any combination with one another, form the subject-matter of the invention, regardless of their summary in the patent claims and references and regardless of their description or depiction, respectively, in the drawings:

DETAILED DESCRIPTION OF THE INVENTION

Figure 1:
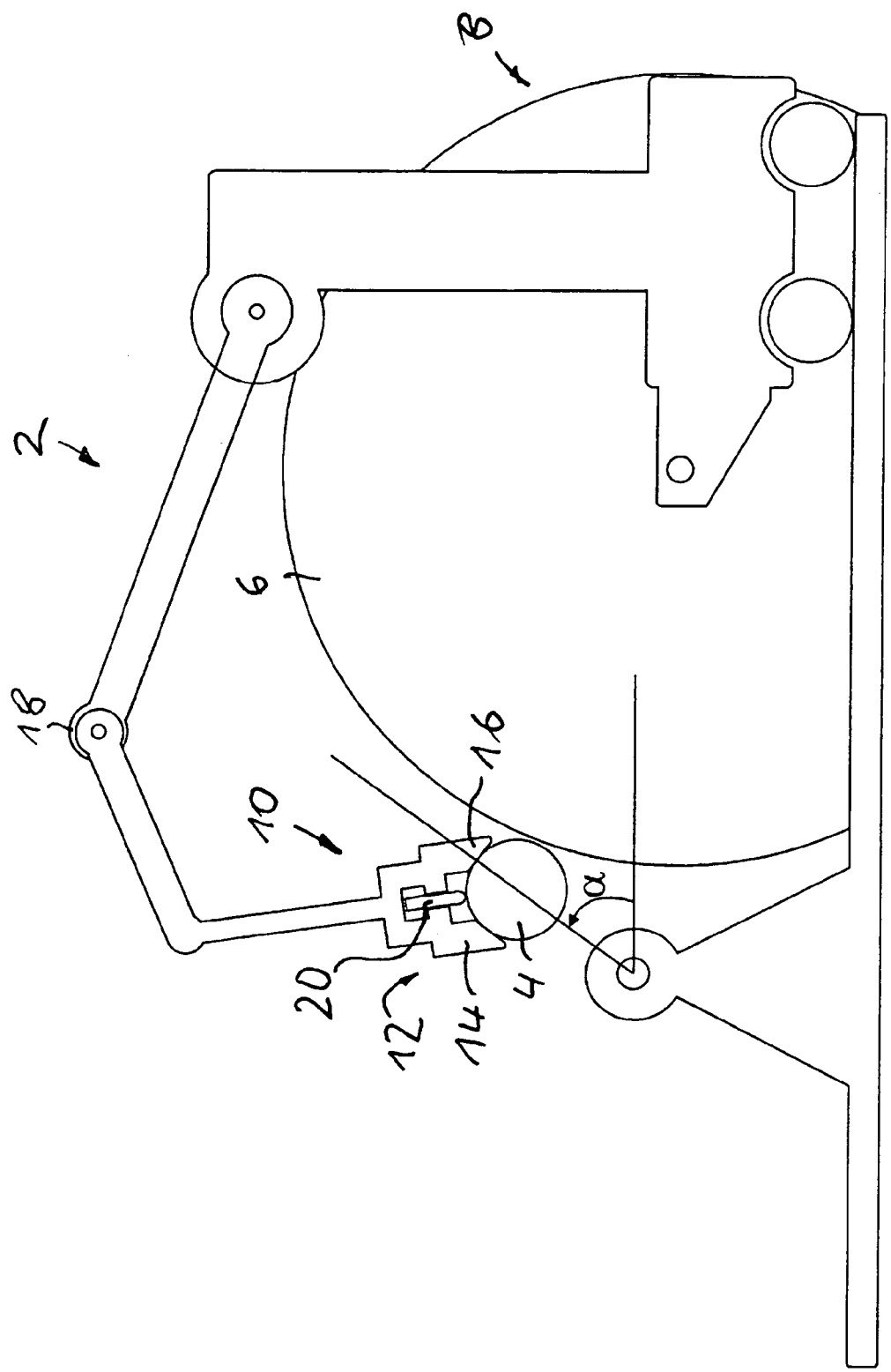
FIG. 1 is a schematic side view of a measuring arrangement for performing an exemplary embodiment of an inventive measuring method.

FIG. 1 is a highly schematic depiction of only an example of an embodiment of an apparatus 2 for performing an exemplary embodiment of an inventive method. The apparatus 2 provides in-process measuring of the shape or profile of a crankpin 4 during machining by means of a grinding wheel 6 in a grinding machine 8 that is only indicated schematically in FIG. 1. The apparatus 2 has a measuring arrangement 10 that in this embodiment has a measuring prism 12. The measuring prism 12 has two legs 14, 16 that during the measuring process are in contact with the crankpin 4 while crankpin 4 performs an orbital rotation. The apparatus 2 has a linkage 18, merely indicated schematically in FIG. 1, in order to hold the measuring prism 12 in contact with the crankpin 4 during the orbital rotation of the crankpin 4. The measuring arrangement 10 furthermore has a measuring sensor 20, which in this embodiment is a linearly movable measuring sensor.

The manner in which measured values are recorded by means of the measuring arrangement 10 while the crankpin 4 is being machined is known in general to one of ordinary skill in the art, for instance from WO-A-9712724 and EP-A-1 263 547, each of which is incorporated herein by reference, and shall therefore not be explained in greater detail here.

Figure 2:
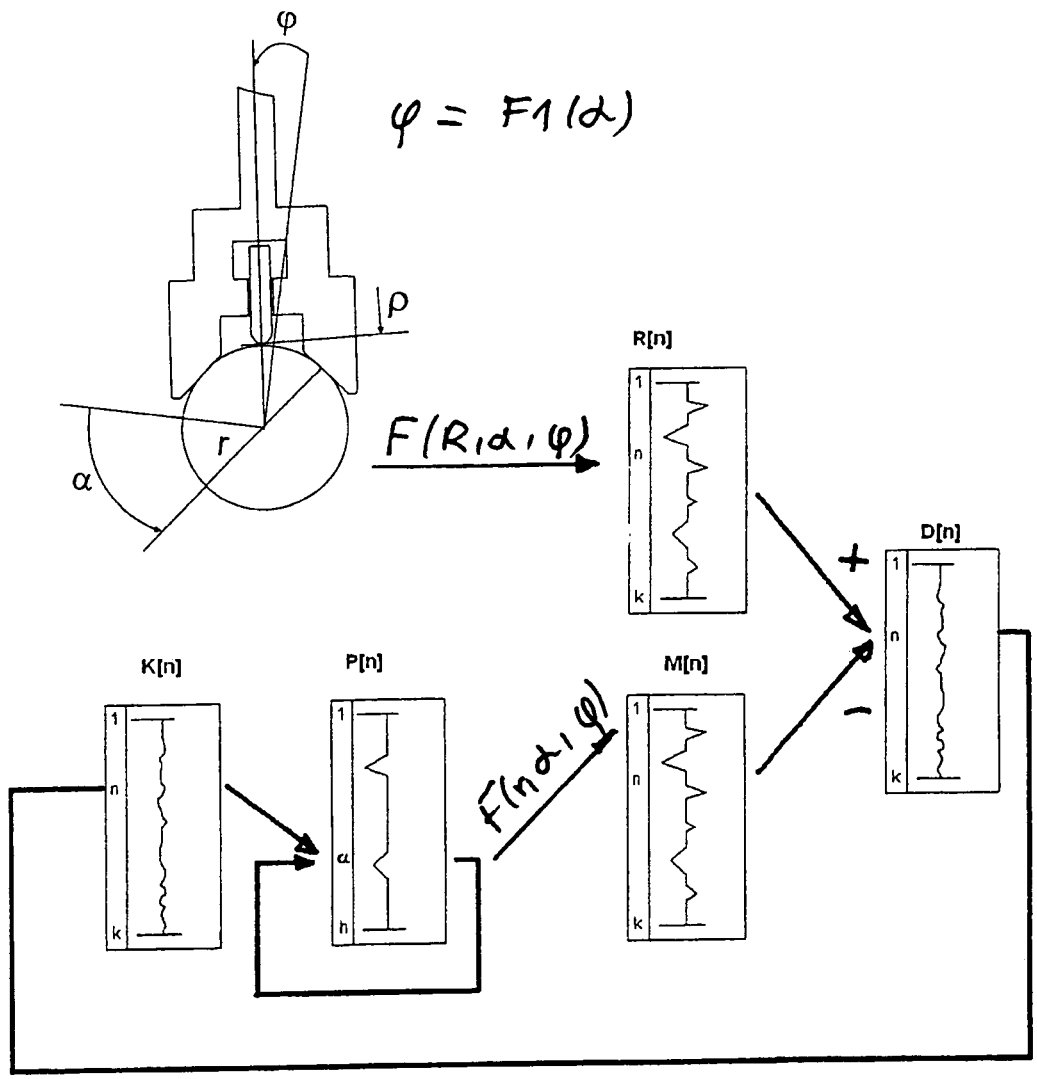
FIG. 2 is an overview diagram for clarifying the basic progression of the inventive method; and, FIG. 3 is an enlarged depiction of the measuring arrangement, comprising a measuring prism and a measuring sensor, in combination with the workpiece to be machined.

FIG. 2 provides a schematically simplified clarification of the progression of an embodiment of the method according to the invention.

During the measurement or determination of the profile of a workpiece that in this exemplary embodiment is formed by a crankpin for a crankshaft, an array R[n] is generated in the angular position α by means of the measuring prism. The distribution of the points with index n in the array is distorted by the relative pivot movement φ of the measuring prism relative to the origin of the angle α. This distortion is defined by the mechanism for the measuring apparatus and can be described as a function of the angle α. The correlation between the angle α and the index n is thus taken into account by the function F.

An array M[n] is calculated from an array P[α]. The same transfer function F is applied as when the raw data R[n] are recorded by the measurement. The array P[α] is changed by continuous iteration until the array M[n] is as identical as possible to the array R[n]. The array D[n] forms a difference array between the actual array M[n] and the raw data in R[n].

The array K[n] is generated from the difference array K[n] using a correction strategy selected according to the specific requirements. This array is optimized such that a rapid convergence is attained on the one hand, and so that the closed control circuit is stable on the other hand. The correction data K[n] are added to the array P[α] in each iteration step. After enough iteration steps the array P[α] matches the polar coordinates for the workpiece closely enough to be able to evaluate the shape or the profile of the workpiece, respectively.

Figure 3:
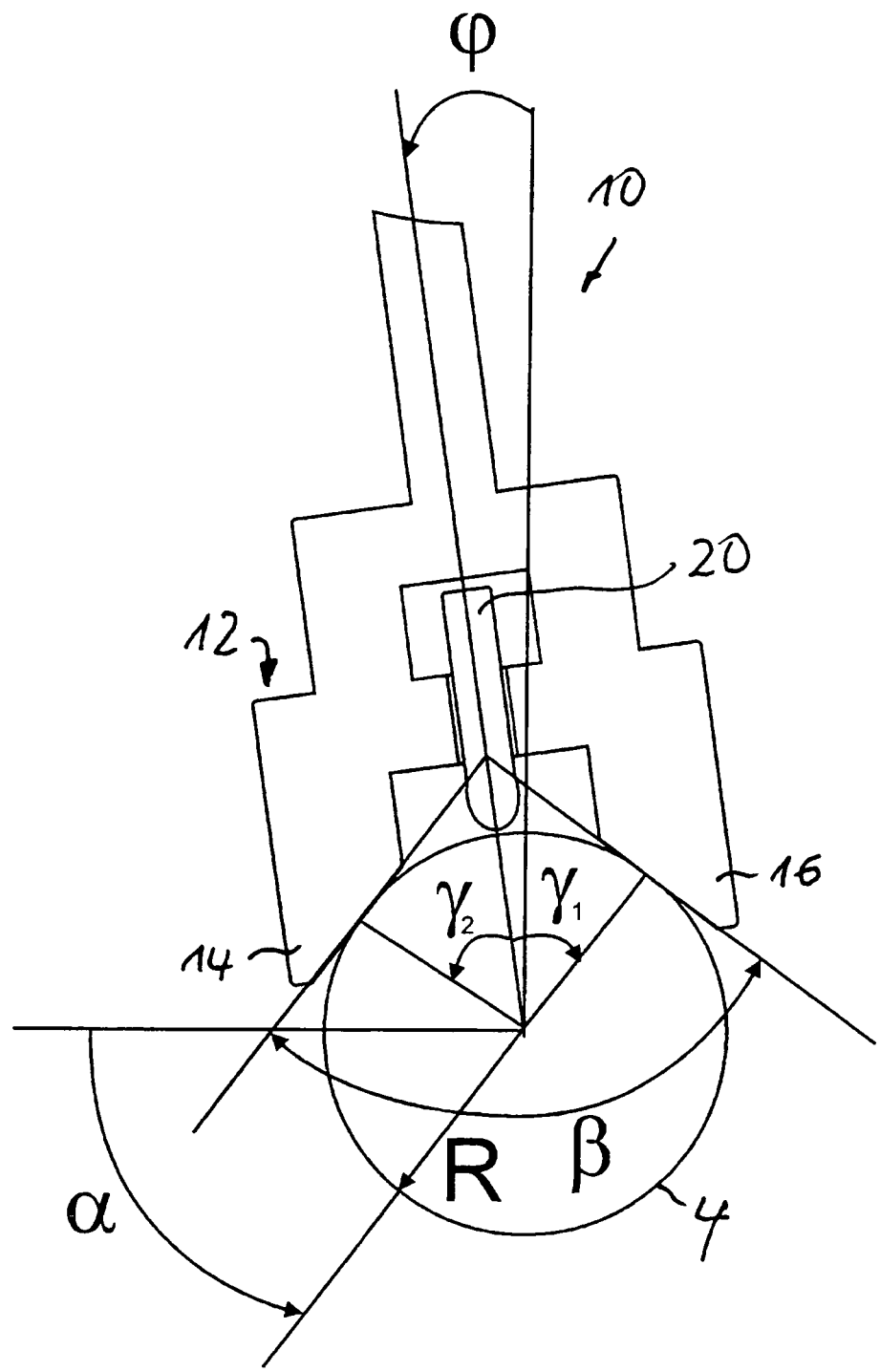

An embodiment of the inventive method is explained in greater detail in the following, in which the following nomenclature is used:

β Vertical angle of the prism
$\gamma_1$, $\gamma_2$ Angles of the contact points on the prism legs with respect to the location being measured by the measuring sensor
α Angular position of workpiece
$R_{(\alpha)}$ Polar coordinates of the measured workpiece
ρ Movement of measuring sensor in the prism leg
φ Angular position of the prism
$\rho'_{(\alpha)}$ Measured value progression ("sensor raw values") for measuring sensor in the prism leg during one rotation
$\phi_{(\alpha)}$ Progression of the angular position of the prism during one workpiece rotation, e.g. ±10°
$r_{(\alpha)}$ Approximate values for polar coordinates of the measured workpiece shape
$\rho_{(\alpha)}$ Model calculation for measured value progression
$\delta_{(\alpha)}$ Difference values between $\rho_{(\alpha)}$ and $\rho'_{(\alpha)}$
$\epsilon_{(\alpha)}$ Correction values
$k_1$ Damping coefficient FIG. 3 is an enlarged depiction of the measuring apparatus 10 in combination with the crankpin 4, a few of the variables from the foregoing being added to the figure for clarification.

During the measurement of the shape or profile of a crankpin, the embodiment of the method according to the invention is carried out in detail as follows:

In step a) of the method according to the invention the progression of measured values for the measuring sensor in the prism leg (measuring sensor raw data $\rho_{(\alpha)}$) and the progression of the angular position $\phi_{(\alpha)}$ are found during one rotation or during a number of rotations of the crankpin. Alternatively the angular position $\phi_{(\alpha)}$ may also be calculated with geometric means from the geometry of the measuring arrangement.

In step b) of the method according to the invention the approximate values representing the shape of the workpiece are established in polar coordinates, for instance by specifying a circular shape:

$r_{(\alpha)}=0$

This is followed by step c) of the method according to the invention, in which step modeled measured values are calculated using the approximate values. Models of varying complexity may be used depending on the actual requirements. In the present exemplary embodiment, a model is used in which the measuring arrangement has three-point contact with the crankpin at angles $\gamma_1$ and $\gamma_2$:

$$\rho'_{(\alpha)} = r_{(\alpha \cdot \varphi_{(\alpha)})} - \frac{1}{2 \cdot \sin\left(\frac{\pi}{2} - \Upsilon_1\right)} \cdot r_{(\alpha + \varphi_{(\alpha)}) - \Upsilon_1)} - \frac{1}{2 \cdot \sin\left(\frac{\pi}{2} - \Upsilon_2\right)} \cdot r_{(\alpha + \varphi_{(\alpha)}) + \Upsilon_2)}$$

Then in step b) the measured values found by means of the measuring sensor are compared to the modeled measured values and difference values are calculated:

$\delta_{(\alpha)} = \rho_{(\alpha)} - \rho'_{(\alpha)}$

In the embodiment depicted, step d) includes substep d1), in which correction values are calculated from the difference values, and substep d2), in which the approximate values are corrected using the correction values. In the calculation of the correction values from the difference values, the difference values at three points can be used for instance for calculating each angular position according to the following formula:

$$\epsilon_{(\alpha)} = \delta_{(\alpha + \varphi_{(\alpha)})} - \frac{1}{2 \cdot \sin\left(\frac{\pi}{2} - \Upsilon_1\right)} \cdot \delta_{(\alpha + \varphi_{(\alpha)}) - \Upsilon_1)} - \frac{1}{2 \cdot \sin\left(\frac{\pi}{2} - \Upsilon_2\right)} \cdot \delta_{(\alpha + \varphi_{(\alpha)}) + \Upsilon_2)}$$

In the exemplary embodiment depicted, the approximate values are corrected using the correction values in that the correction values are added to the existing approximate values, a damping factor being taken into account according to the following formula in order to obtain new approximate values:

$$r'_{(\alpha)} = r_{(\alpha)} + \frac{1}{k_1} \cdot \epsilon_{(\alpha)}$$

According to the invention, steps c) through e), described in the foregoing, are iterated until a termination condition has been met. The termination condition is defined for instance by comparing the standard deviation of the difference values to a limiting value. If the desired accuracy has not yet been attained, the new approximate values found in step e) form the basis for a new iteration beginning with step c) of the inventive method.

If the desired accuracy has been met, the new approximate values found in step e) form the polar coordinates sought for the shape of the workpiece:

$R_{(\alpha)} \approx r'_{(\alpha)}$

The inventive method enables rapid and precise determination of the shape or profile of a workpiece using measured values obtained by means of a measuring sensor. The inventive method may be carried out by a calculation unit including a processor as will be readily understood by a person having ordinary skill in the art.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Method for determining the shape of a pin having a pin axis during a machining process, comprising the following steps:
    a) measured values representing the shape of the pin are determined and stored by use of a measuring sensor, the measured values being obtained during a machining process, during which the pin performs an orbital rotation about a rotational axis that is parallel to the pin axis, and a measuring prism contacting the pin being used, the measuring prism being arranged on the measuring sensor;
    b) approximate values representing the shape of the pin are determined during a machining process by a calculation unit including a processor;
    c) modeled measured values are calculated using the approximate values during a machining process by the calculation unit;
    d) the measured values found by use of the measuring sensor are compared to the modeled measured values and difference values are calculated during a machining process by the calculation unit, step d) including the following substeps:
        d1) calculation of correction values from the difference values;
        d2) correction of the approximate values using the correction values;
        d3) the correction values being added to the approximate values in step d2); and
        d4) a damping factor being taken into account when the correction values are added to the approximate values according to the following formula $$r'_{(\alpha)} = r_{(\alpha)} + \frac{1}{k_1} \cdot \epsilon_{(\alpha)}$$

in which:
    $r_{(\alpha)}$ are approximate values for polar coordinates of the measured workpiece shape;
    $\epsilon_{(\alpha)}$ are correction values; and
    $k_1$ are a damping coefficient;
    e) new approximate values are calculated from the difference values during a machining process for an optimized approximation to the shape of the pin by the calculation unit;
    f) steps c) through e) are iterated during a machining process until a termination condition is met; and
    g) the approximate values in effect when the terminating condition is met are stored as the shape of the pin during a machining process.

2. Method according to claim 1, wherein a linearly movable measuring sensor is used.

3. Method according to claim 1, wherein in step a) the measured values are found as a function of the angular position of the pin.

4. Method according to claim 1, wherein a limiting value for at least one difference value is used for a termination condition in step f).

5. Method according to claim 4, wherein the standard deviation for the difference values is compared to a limiting value.

6. Method according to claim 1, wherein the machining includes grinding.

7. Method according to claim 1, wherein the shape of the pin determined is the shape of a crankpin.

* * * * *